United States Patent
Chen et al.

(10) Patent No.: US 10,782,469 B2
(45) Date of Patent: Sep. 22, 2020

(54) LIGHT GUIDE PLATE AND ITS FABRICATING METHOD, AS WELL AS BACKLIGHT MODULE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yinwei Chen, Beijing (CN); Heling Zhu, Beijing (CN); Liang Xiao, Beijing (CN); Yezhou Tan, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 16/399,054

(22) Filed: Apr. 30, 2019

(65) Prior Publication Data
US 2020/0064538 A1  Feb. 27, 2020

(30) Foreign Application Priority Data
Aug. 24, 2018  (CN) .......................... 2018 1 0974919

(51) Int. Cl.
*F21V 8/00* (2006.01)

(52) U.S. Cl.
CPC ........... *G02B 6/0065* (2013.01); *G02B 6/004* (2013.01); *G02B 6/0036* (2013.01); *G02B 6/0073* (2013.01)

(58) Field of Classification Search
CPC .... G02B 6/0065; G02B 6/0036; G02B 6/004; G02B 6/0073
See application file for complete search history.

(56) References Cited

U.S. PATENT DOCUMENTS 6,390,629 B1 * 5/2002 Mimura ................. G02B 5/124
359/529
7,056,005 B2   6/2006 Lee
(Continued)

FOREIGN PATENT DOCUMENTS

| CN | 1949047 A | 4/2007 |
|---|---|---|
| CN | 1996059 A | 7/2007 |

(Continued)

OTHER PUBLICATIONS

First Office Action for CN Appl. No. 201810974919.9, dated Oct. 15, 2019.

*Primary Examiner* — Tsion Tumebo
(74) *Attorney, Agent, or Firm* — The Webb Law Firm

(57) ABSTRACT

The present disclosure relates to a light guide plate and its fabricating method, as well as a backlight module. The light guide plate comprises a light-transmitting plate body provided with a plurality of light guide dots on a light-exiting surface thereof, and further provided with a plurality of dimming pits, wherein a plurality of light guide dots are provided around each of the dimming pits; an inner wall of each of the dimming pits sequentially includes multiple levels of dimming surfaces along a depth direction of the dimming pits, for reflecting light incident thereon to the light guide dots. The backlight module comprises the light guide plate provided in the above-described technical solution.

13 Claims, 5 Drawing Sheets

(56) References Cited

U.S. PATENT DOCUMENTS

| | | | | |
|---|---|---|---|---|
| 7,378,686 | B2* | 5/2008 | Beeson | H01L 33/58 |
| | | | | 257/100 |
| 7,791,683 | B2* | 9/2010 | Larson | G02B 6/0018 |
| | | | | 349/62 |
| 7,950,813 | B2* | 5/2011 | Mimura | G02B 5/124 |
| | | | | 359/530 |
| 8,246,187 | B2* | 8/2012 | Cheong | G02F 1/133611 |
| | | | | 362/612 |
| 8,301,002 | B2* | 10/2012 | Shani | G02B 6/0018 |
| | | | | 362/97.1 |
| 2006/0290253 | A1* | 12/2006 | Yeo | G02B 5/0226 |
| | | | | 313/116 |
| 2008/0055931 | A1* | 3/2008 | Verstraete | G02B 6/0068 |
| | | | | 362/612 |
| 2008/0186273 | A1* | 8/2008 | Krijn | G02B 6/0021 |
| | | | | 345/102 |
| 2010/0002414 | A1* | 1/2010 | Meir | G02B 6/0021 |
| | | | | 362/84 |
| 2010/0046219 | A1* | 2/2010 | Pijlman | G02B 6/0021 |
| | | | | 362/235 |
| 2010/0220484 | A1* | 9/2010 | Shani | G02B 5/021 |
| | | | | 362/296.09 |
| 2011/0069496 | A1* | 3/2011 | Ing | B29D 11/00798 |
| | | | | 362/311.02 |
| 2012/0069579 | A1* | 3/2012 | Koh | G02B 6/0021 |
| | | | | 362/307 |
| 2015/0260901 | A1* | 9/2015 | Onac | G02B 6/0018 |
| | | | | 362/612 |

FOREIGN PATENT DOCUMENTS

| | | |
|---|---|---|
| CN | 201593724 U | 9/2010 |
| CN | 201757337 U | 3/2011 |
| CN | 206193278 U | 5/2017 |
| CN | 107966856 A | 4/2018 |
| JP | 2007-149575 A | 6/2007 |

* cited by examiner

LIGHT GUIDE PLATE AND ITS FABRICATING METHOD, AS WELL AS BACKLIGHT MODULE

CROSS-REFERENCE TO RELATED APPLICATIONS

The present application claims the priority of the Chinese Patent Application No. 201810974919.9 filed on Aug. 24, 2018, the entirety of which is hereby incorporated by reference as a part of this application.

TECHNICAL FIELD

The present disclosure relates to a light guide plate and its fabricating method, as well as a backlight module.

BACKGROUND

The related liquid crystal display comprises a backlight module and a liquid crystal panel. The backlight module provides light to the liquid crystal panel, so that the liquid crystal panel modulates the light, thereby realizing image display.

The related direct-lit backlight module are widely applied to large-size liquid crystal displays that can realize High-Dynamic Range (HDR) images due to its advantages such as locally controllable light and high backlight efficiency.

SUMMARY

The present disclosure provides a light guide plate comprising a light-transmitting plate body, wherein a plurality of light guide dots are disposed on a light-exiting surface of the light-transmitting plate body; the light-exiting surface of the light-transmitting plate body is provided with a plurality of dimming pits, a plurality of light guide dots are provided around each of the dimming pits; an inner wall of each of the dimming pits sequentially includes multiple levels of dimming surfaces along a depth direction of the dimming pits, for reflecting light incident thereon to the light guide dots.

The present disclosure further provides a method of fabricating a light guide plate according to the above-described technical solution, which comprises:

providing a light guide plate mold, wherein the light guide plate mold includes a plate body mold which is provided with a plurality of dot molds for forming the plurality of light guide dots and a plurality of dimming molds for forming the plurality of dimming pits; the dimming molds sequentially include multiple levels of mold surfaces for forming the multiple levels of dimming surfaces along a direction in which the height of the dimming molds increase;

adding plate body material to the light guide plate mold such that the plate body material is molded with the light guide plate mold, to obtain the light guide plate.

The present disclosure further provides a backlight module. The backlight module comprises a light source and a light guide plate, and the light source is disposed on a light-incident surface of the light-transmitting plate body of the light guide plate.

The present disclosure further provides a display device. The display device comprises a backlight module according to the above-described technical solution.

BRIEF DESCRIPTION OF THE DRAWINGS

The drawings described herein are used to provide a further understanding of the present disclosure and consti-tute a part of the present disclosure. The illustrative embodiments of the present disclosure as well as the descriptions thereof, which are used for explaining the present disclosure, do not constitute improper limitations on the present disclosure. In the drawings.

DETAILED DESCRIPTION

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. On the basis of the embodiments of the present disclosure, all the other embodiments acquired by a person skilled in the art on the premise that no inventive effort is involved fall into the scope protected by the present disclosure.

The light guide plate and the fabricating method thereof, as well as a backlight module and a display device provided by the embodiments of the present disclosure will be described in detail below in conjunction with the accompanying drawings.

Figure 1:
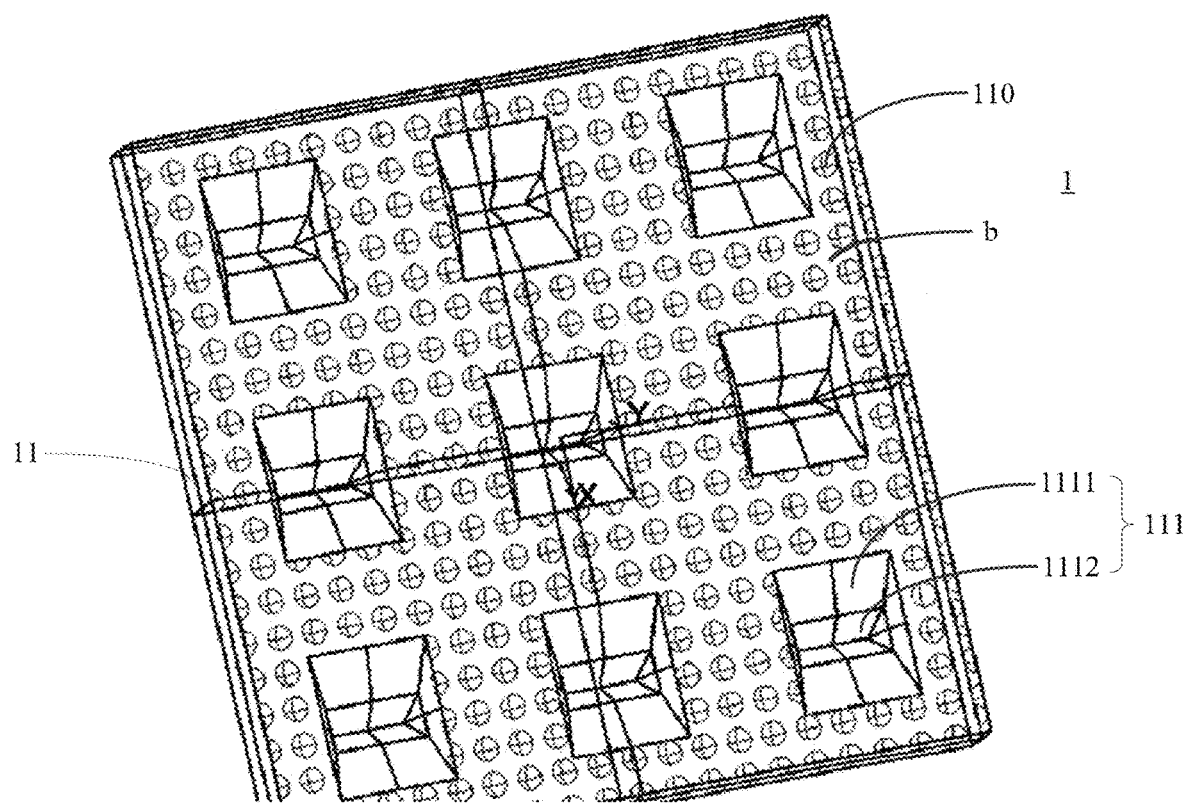
FIG. 1 is a schematic perspective view of a light guide plate provided by an embodiment of the present disclosure.
Figure 2:
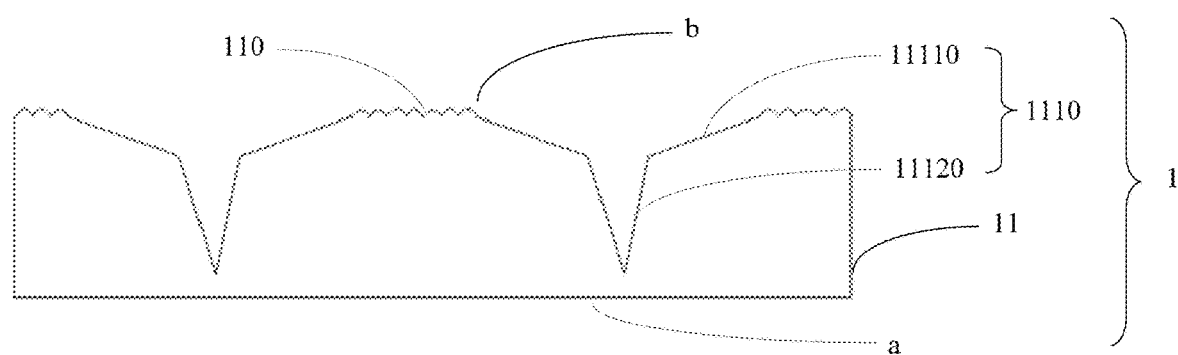
FIG. 2 is a schematic side view of a structure of a light guide plate provided by an embodiment of the present disclosure.
Figure 3:
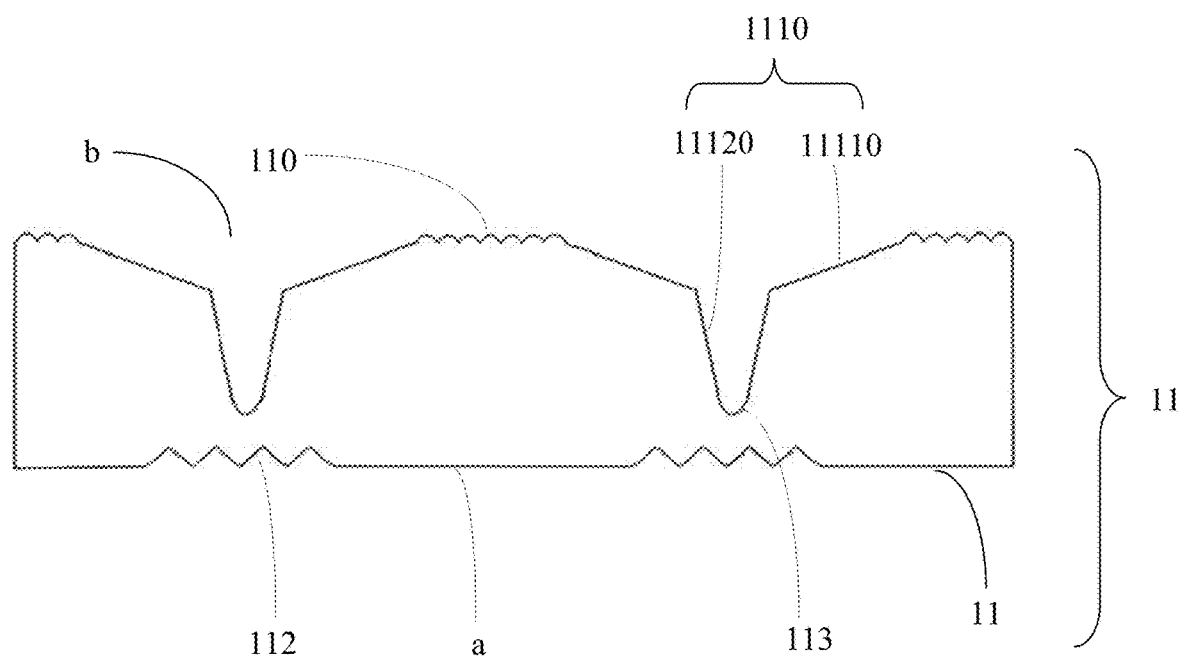
FIG. 3 is a schematic side view of a structure of a light guide plate provided by an embodiment of the present disclosure.

As shown in FIGS. 1-3, the light guide plate 1 provided by the embodiments of the present disclosure comprises a light-transmitting plate body 11. The thickness of the light-transmitting plate body 11 is set, according to actual needs, to be generally between 0.4 mm and 0.6 mm. A plurality of light guide dots 110 are disposed on a light-exiting surface b of the light-transmitting plate body 11. The light-exiting surface b of the light-transmitting plate body 11 is further provided with a plurality of dimming pits 111, and a plurality of light guide dots 110 are provided around each of the dimming pits 111. These light guide dots 110 can be convex light guide dots 110 or concave light guide dots 110. The contour shape of the light guide dots 110 can be an approximately spherical cambered profile or a polyhedral structure. An inner wall 110 of each of the dimming pits sequentially includes multiple levels of dimming surfaces, along a depth direction of the dimming pits 111, for reflecting light incident thereon to the light guide dots 110.

It is to be understood that, the above-described light-transmitting body 11 has a variety of plate body materials, such as polymethyl methacrylate (PMMA), polycarbonate (PC) or photosensitive adhesive (UV glue). The light guide plate 1 provided by the embodiments of the present disclosure can be fabricated by methods such as an injection molding method or a curing method. In order to facilitate the fabrication of the light guide plate 1, a mold of the light guide plate 1 can be provided in advance, and then the material of the light guide plate 1 is subjected to an injection molding or curing treatment using the mold of the light guide plate 1, so as to form the light guide plate 1.

The relative positional relationship between the light-incident surface a of the light-transmitting plate body 11 and the light-exiting surface b of the light-transmitting plate body 11 can be set according to the type of the light guide plate 1. When the light guide plate 1 is an edge-lit light guide plate, the light-incident surface a of the light-transmitting plate body 11 and the light-exiting surface b of the light-transmitting plate body 11 are in a non-parallel state. For example, there is an angle of 90° formed between the light-incident surface a of the light-transmitting plate body 11 and the light-exiting surface b of the light-transmitting plate body 11. When the light guide plate 1 is a direct-lit light guide plate, the light-incident surface a of the light-transmitting plate body 11 and the light-exiting surface b of the light-transmitting plate body 11 are in a parallel state.

As shown in FIGS. 1-3, 7 and 8, when light is guided by the light guide plate 1 provided by the embodiments of the present disclosure, light enters an interior of the light-transmitting plate body 11 from the light-incident surface a of the light-transmitting plate body 11. When light is transmitted to the light-exiting surface b of the light-transmitting plate body 11, light is reflected on the multiple levels of dimming surfaces included in each of the dimming pits 111 provided on the light-exiting surface of the light-transmitting substrate, to change a light propagation angle, such that a part of the light is reflected to places of the light-exiting surface of the transparent substrate where the dimming pits 111 are not provided, and scattered by the light guide dots 110 at these places, so as to make relatively uniform light exiting from the light guide plate 1. Here, although the light source 12 cannot exit from the position on the light-exiting surface b of the light-transmitting plate body 11 where the dimming pits 111 are provided, it is possible to make the light uniformly exit from the respective positions of the light-exiting surface b of the light-transmitting plate body 11, by scattering such light using the light guide dots 110 provided on the light-exiting surface of the light-transmitting plate body 11. In this process, uniform light exiting from the light guide plate 1 is realized by coupling the multiple levels of dimming surfaces included in the inner wall of each of the dimming pits 111 and the light guide dots 110 around the corresponding dimming pit 111 to each other. By setting an angle of the dimming surfaces, the light from the light source 12 can be totally reflected from the multiple levels of dimming surfaces to the light guide dots 110.

It can be known from the structure and the specific light guide process of the light guide plate 1 that, the light-exiting surface of the light-transmitting plate body 11 is not only provided with a plurality of light-guiding dots 110, but also with a plurality of dimming pits 111. The inner wall 1110 of each of the dimming pits includes multiple levels of dimming surfaces for reflecting light along a depth direction of the dimming pits 111, which causes that the multiple levels of dimming surfaces included in the inner wall 1110 of each of the dimming pits can reflect the light transmitted from the light-incident surface a of the light-transmitting plate body 11 to the light-exiting surface b of the light-transmitting plate body 11 one or more times. Under the scattering effect of the plurality of light guide dots 110 around the light-exiting surface b of the light-transmitting plate body 11, the reflected light finally exits from the light-exiting surface b of the light-transmitting plate body 11 uniformly. It can be seen that, the light guide plate 1 provided by the embodiments of the present disclosure can have a high optical efficiency to reduce unnecessary energy consumption under the premise of reducing a light mixing distance. When the light guide plate 1 provided by the embodiments of the present disclosure is applied to a direct-lit backlight module, the light emitted by the light source 12 can be sufficiently guided and mixed by the light guide plate 1 to reduce a light mixing distance required for the direct-lit backlight module, so that it is possible to reduce the stacking thickness of the direct-lit backlight module. Therefore, the direct-lit backlight module is thin, so that the direct-lit backlight module can be used in a small-size liquid crystal display.

In addition, when the light guide plate 1 provided by the embodiments of the present disclosure is applied to the direct-lit backlight module, since the light source 12 of the direct-lit backlight module is located below the light guide plate 1, there is no need to excessively consider the problem of a frame width for the direct-lit backlight module, so that the direct-lit backlight module can be used in a narrow bezel display device.

It should be noted that, as shown in FIGS. 1-3 and 8, when the light guide plate 1 described above is applied to the backlight module, the number of the light sources 12 included in the backlight module can be the same with that of the dimming pits 111 provided on the light-exiting surface b of the light-transmitting body 11 described above. A plurality of the light sources 12 are formed on the base substrate 10, and then an orthographic projection of the plurality of dimming pits 111 on the base substrate 10 covers an orthographic projection of a plurality of the light sources 12 on the base substrate 10 at least in one-to-one correspondence. At this time, the light emitted by the corresponding light source 12 is adjusted by each of the dimming pits 111, so that the light emitted by the light source 12 can uniformly exit from the light-exiting surface b of the light-transmitting body 11, which makes it possible to avoid the problem of a light shadow on a screen resulting from an insufficient mixed light distance.

Exemplarily, when the plurality of light sources 12 described above are arranged in a lattice form, the dimming pits 111 described above are also arranged in a lattice form, and the mutual correspondence relationship therebetween can be as described above.

Figure 8:
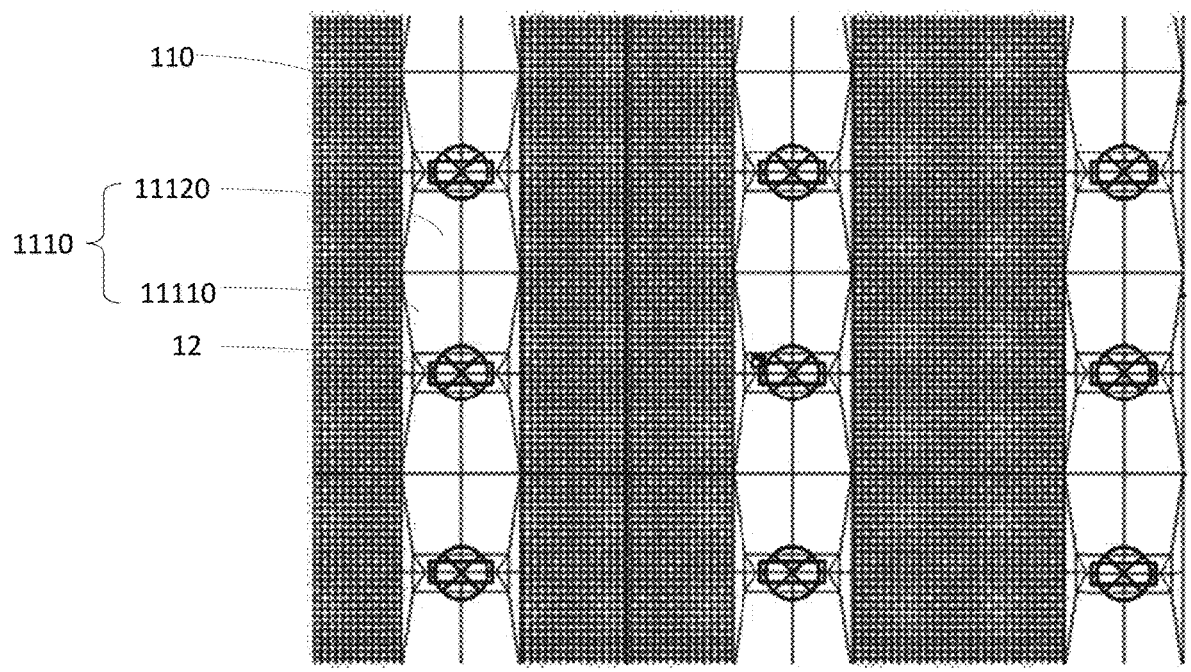
FIG. 8 is a schematic top view of a structure of a backlight module provided by an embodiment of the present disclosure.

In some embodiments, as shown in FIGS. 2, 3 and 8, the angles between the respective level of dimming surfaces included in the inner wall 1110 of each of the dimming pits and the plane in which the light-exiting surface b of the light-transmitting plate body 11 is situated sequentially increase along the direction in which the depth of each of the dimming pits 111 increases, which facilitates providing the dimming pits 111, and causes that the incident angle of light on the respective level of dimming surfaces included in the inner wall 1110 of each of the dimming pits is sequentially reduced along the direction in which the depth of each of the dimming pits 111 decreases.

Exemplarily, as shown in FIGS. 1-3 and 8, along the direction in which the depth of each of the dimming pits increases, the inner wall of each of the dimming pits 1110 includes a first-level dimming surface 11110 and a second-level dimming surface 11120, wherein there is an angle of less than 45° between the first-level dimming surface 11110 and a plane in which the light-exiting surface b of the light-transmitting plate body 11 is situated, and there is an angle of greater than or equal to 45° and less than 90° between the second-level dimming surface 11120 and a plane in which the light-exiting surface b of the light-transmitting plate body 11 is situated. In one or more embodiments according to the present disclosure, by configuring the angles of the first-level dimming surface 11110 and the second-level dimming surface 11120 with the plane in which the light-exiting surface b of the light-transmitting plate body 11 is situated as well as a refractive index of the material, when light exits from the incident surface to the light-exiting surface b of the light-transmitting plate body 11, the incident angles of light exiting to the first-level dimming surface 11110 and the second-level dimming surface 11120 included in the inner wall 1110 of each of the dimming pits can be made to be greater than a total reflection angle. Therefore, the light totally reflected by the first-level dimming surface 11110 and the second-level dimming surface 11120 included in the inner wall 1110 of each of the dimming pits is uniformly scattered by the light guide dots 110, thereby ensuring uniform light exit.

In some embodiments, as shown in FIGS. 1-3, each of the dimming pits 111 includes multiple levels of dimming portions in one-to-one correspondence to the multiple levels of dimming surfaces, and an inner wall of each level of the dimming portions includes at least one corresponding level of dimming surface. Here, the number of each level of the dimming surfaces can be set according to actual conditions. When the inner wall 1110 of each of the dimming pits includes the first-level dimming surface 11110 and the second-level dimming surface 11120, each of the corresponding dimming pits 111 includes a first-level dimming portion 1111 corresponding to the first-level dimming surface 11110, and a second-level dimming portion 1112 corresponding to the second-level dimming surface 11120.

FIG. 1 shows a light guide plate 1, in which a segmented profile of each of the dimming pits 111 is displayed: the inner wall of each level of the dimming portions included in each of the dimming pits 111 includes four corresponding levels of dimming surfaces which enclose the inner wall of respective level of dimming portions, so that each of the dimming pits 111 exhibits a pyramid structure.

Figure 7:
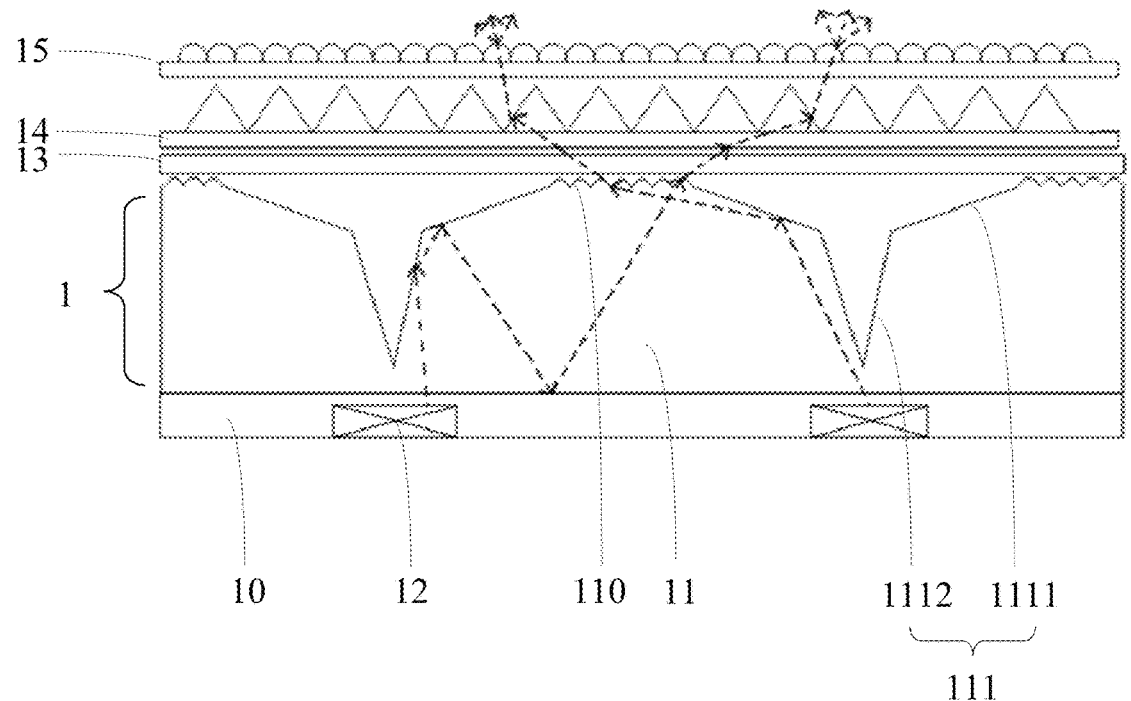
FIG. 7 is a schematic view of a structure of a backlight module provided by an embodiment of the present disclosure.

In other specific embodiments, as shown in FIGS. 3, 7 and 8, the bottom of each of the dimming pits 111 is a cambered bottom 113, and an arc-shaped opening of the cambered bottom 113 of each of the dimming pits 111 faces an opening portion of the corresponding dimming pit 111, such that the dimming pit 111 thus formed is more shallow than the dimming pit having a sharp-angled bottom, thereby reducing a thickness of the light guide plate 1, so that the light guide plate 1 is more light and thin. It has been experimentally proved that, the thickness of the light guide plate 1 provided by the embodiments of the present disclosure can be reduced by 0.1 mm by forming the cambered bottom 113. However, when the arc-shaped opening of the cambered bottom 113 of each of the dimming pits 111 faces the opening of the corresponding dimming pit 111, light exits from the dimming pit 111 easily. Especially when each of the dimming pits 111 corresponds to one light source 12, the orthographic projection of the light source 12 on the base substrate 10 is located within the orthographic projection of the dimming pit 111 on the base substrate 10, and at this time, the light emitted by the light source 12 exits from the cambered bottom 113 more easily. Therefore, a plurality of scattering structures 112 in one-to-one correspondence to the plurality of dimming pits 111 are provided on the light-incident surface a of the light-transmitting plate body 11, and an orthographic projection of each of the scattering structures 112 in a plane where the light-incident surface a of the light-transmitting plate body 11 is situated at least partially covers an orthographic projection of the cambered bottom 113 of each of the dimming pits 111 in a plane where the light-incident surface a of the light-transmitting plate body 11 is situated. Thus, when light enters an interior of the light-transmitting plate body 11 through the light-incident surface a of the light-transmitting plate body 11, it is possible to scatter the light by means of each of the scattering structures 112, so that such light is scattered to a large-angle direction, thereby avoiding that the light emitted towards the cambered bottom 113 of each of the dimming pits 111 directly exits from the arc-shaped bottom 113, thereby effectively improving the light utilization efficiency and reducing overall backlight power consumption.

It should be noted that, each of the scattering structures 112 described above is a scattering film; or each of the scattering structures 112 includes a plurality of prismatic pits. When each of the scattering structures 112 includes a plurality of prismatic pits, the prismatic pits are engraved on the light-incident surface a of the light-transmitting plate body 11 directly by an engraving device. At this time, the light-transmitting plate body 11, the light-guiding dot 110, the dimming pit 111, and the scattering structure 112 included in the fabricated light guide plate 1 consist in an integral structure, so that the light guide plate 1 can have a relatively compact structure, thereby reducing the problems of unnecessary structural deformation and product defect.

As shown in FIGS. 1-6, the fabricating method of the light guide plate 1 according to the embodiments of the present disclosure comprises the following steps:

Step S100: providing a light guide plate mold, wherein the material of the light guide plate mold can be selected according to actual conditions, such as a nickel plating mold or a copper plating mold. The light guide plate mold includes a plate body mold 20 which is provided with a plurality of dot molds 23 for forming the plurality of light guide dots 110 and a plurality of dimming molds 2 for forming the plurality of dimming pits 111. The dimming molds 2 include multiple levels of mold surfaces for forming the multiple levels of dimming surfaces along the direction in which the height of the dimming molds 2 increases. When the inner wall of the dimming pit 111 described above includes the first-level dimming surface 11110 and the second-level dimming surface 11120, the corresponding dimming mold 2 includes a first-level mold surface 21 and a second-level mold surface 22.

Step S200: adding plate body material to the light guide plate mold such that the plate body material is molded with the light guide plate mold, to obtain the light guide plate 1. The process of molding the plate material by using the mold of the light guide plate 1 can be considered as an injection molding process or a curing process.

The advantageous effects of the fabricating method of the light guide plate 1 provided by the embodiments of the present disclosure are the same as those of the light guide plate 1 provided in the above-described embodiments, and will not be described in detail here.

Figure 4:
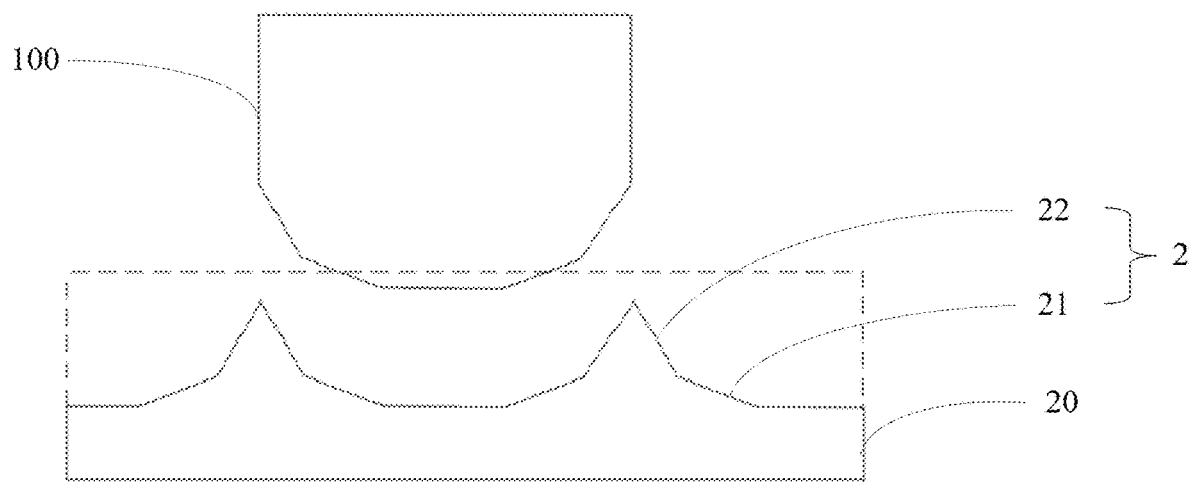
FIG. 4 is a schematic view of a fabricating method of a light guide plate provided by an embodiment of the present disclosure.
Figure 5:
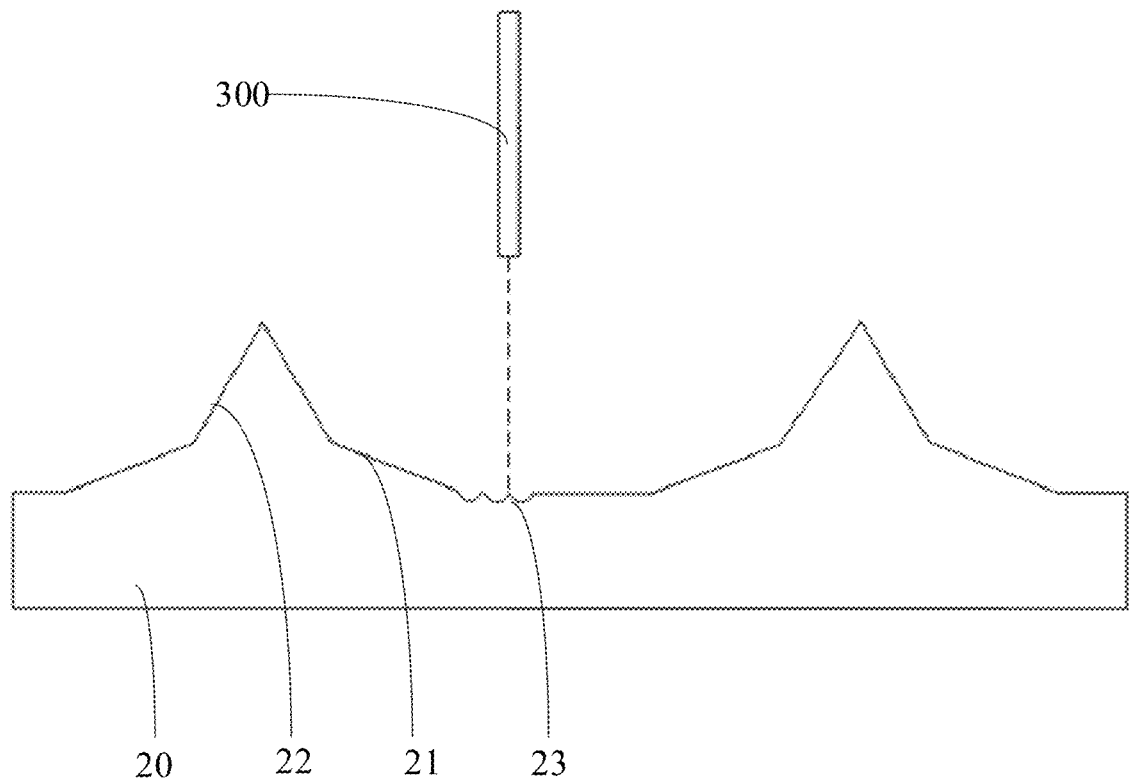
FIG. 5 is a schematic view of a fabricating method of a light guide plate provided by an embodiment of the present disclosure.
Figure 6:
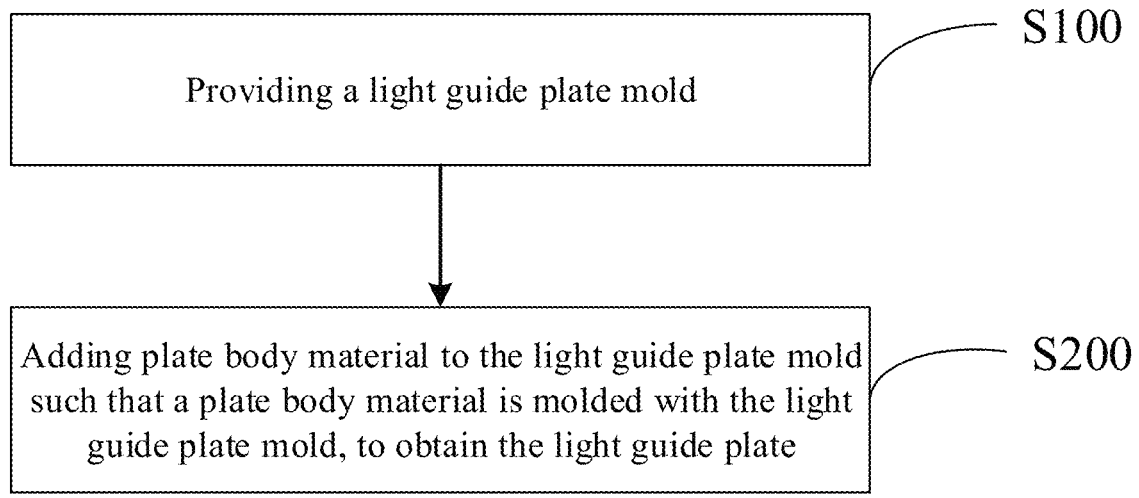
FIG. 6 is a flow chart of fabricating a light guide plate provided by an embodiment of the present disclosure.

Specifically, as shown in FIGS. 4 and 5, the light guide plate mold described above can be fabricated in a process such as engraving. To be specific, the plate mold 20 is first fabricated, and then a plurality of dimming molds 20 are engraved by an engraving device 100 such as an engraving machine and/or a cutter. Next, a plurality of dot molds 23 are fabricated by a dot machining device 300 in a dot collision process, a laser machining process and the like.

Further, as shown in FIG. 3, when the bottom of each of the dimming pits 111 is a cambered bottom 113, and an arc-shaped opening of the cambered bottom 113 of each of the dimming pits 111 faces an opening portion of the corresponding dimming pit 111, on the basis of the light guide plate 1 that has been obtained, it is possible to engrave a plurality of scattering structures 112 on the light-incident surface a of the light-transmitting plate body 11 included in the light guide plate 1, each of which includes a plurality of prismatic pits.

As shown in FIG. 7, the embodiments of the present disclosure further provide a backlight module which comprises a light source 12 and the above-described light guide plate 1, and the light source 12 is disposed on a light-incident surface a of the light-transmitting plate body 11 included in the light guide plate 1.

The advantageous effects of the backlight module provided by the embodiments of the present disclosure are the same as those of the light guide plate 1 provided in the above-described embodiments, and will not be described in detail here.

In some embodiments, as shown in FIGS. 7 and 8, among the light reflected by the multiple levels of dimming surfaces of each of the dimming pits 111 provided on the light-exiting surface b of the light-transmitting plate body 11 included in the light-guide plate 11 described above, there are not only a part of reflected light that is scattered and further exits from a position on the light-exiting surface b of the light-transmitting plate body 11 where a light-guiding dot 110 is provided, but also a part of reflected light that does not exit and is reflected to a direction in which the base substrate 10 is situated, such that such part of light is wasted. In order to make full use of light, a reflective layer is formed on a surface of the base substrate 10 on which the light source 12 is provided. Such part of light is reflected by the reflective layer, so that the light re-enters the light-transmitting body 11 included in the light guide plate 1, thereby further utilizing the light and avoiding unnecessary light loss.

It is to be understood that, the above-described reflective layer is a reflective material layer formed by a white ink, and such reflective material layer can favorably scatter the light to further ensure uniform light entering the light-transmitting plate body 11 included in the light guide plate 1.

In some embodiments, as shown in FIG. 8, after the light emitted by the light source 12 is guided by the light guide plate 1, although the exiting light is relatively uniform, an exit direction of a part of the light forms a large angle relative to a thickness direction of the light guide plate 1. Therefore, when the above-described backlight module provides backlight to the display panel, the screen quality displayed by the display panel is affected. To this end, the light-exiting surface b of the light-transmitting plate body 11 is provided with an light intensifying film 14 having a plurality of prism structures, wherein each of the prism structures has an apex angle of less than 45°. When the light guided by the light guide plate 1 passes through the light intensifying film 14, each prism structure of the light intensifying film 14 can further gather the light guided by the light guide plate 1. At this time, the angle formed by the light propagation direction adjusted by the light intensifying film 14 relative to a thickness direction of the light guide plate 1 is greatly reduced, so that the backlight light finally provided by the backlight module is almost perpendicular to a thickness direction of the backlight module. In this way, the light energy of the backlight provided by the backlight module is concentrated at a forward viewing angle, so that the screen displayed by the display panel has better brightness and resolution.

In some embodiments, as shown in FIG. 7, when the backlight module provides white light, the following two implementing manners can be adopted.

First implementing manner: the light source 12 is a non-white light source, and the light-exiting surface of the light source 12 is provided with a fluorescent layer for converting light from the light source 12 into white light. For example, if the color of the light emitted by the light source 12 is blue, then the fluorescent layer disposed on the light-exiting surface of the light source 12 can be a yellow fluorescent layer or a mixed fluorescent layer formed by mixing red fluorescent material and green fluorescent material.

Second implementing manner: the light source 12 is a non-white light source, and the light-exiting surface of the light guide plate 1 is provided with a color control layer 13 which can be a quantum dot material layer or fluorescent layer. The quantum dot material layer or fluorescent layer is used for controlling the backlight module to provide white backlight.

If the light-exiting surface of the light guide plate 1 is provided with quantum dot material, when the color of the light emitted by the light source 12 is blue light, the quantum dot material layer can emit yellow light which is mixed with blue light to form white light, under the excitation of the blue light guided by the light guide plate 1. If the light-exiting surface of the light source 1 is provided with a fluorescent layer, the fluorescent layer is a yellow fluorescent layer or a mixed fluorescent layer formed by mixing red fluorescent material and green fluorescent material.

In some embodiments, as shown in FIGS. 7 and 8, the number of the light sources 12 formed on the base substrate 10 is plural, and an orthographic projection of the plurality of dimming pits 111 on the base substrate 10 covers an orthographic projection of a plurality of the light sources 12 on the base substrate 10 at least in one-to-one correspondence, such that the light exiting from each of the light sources 12 can be reflected by the multiple levels of dimming surfaces included in the inner wall 1110 of the corresponding dimming pit to a maximum extent, which causes that a part of such light is reflected to the position of the light guide dot 110 and exits after being scattered by the light guide dot 110, and the other part is reflected onto the base substrate 10, and then reflected by the base substrate 10 back into the light guide plate 1 so as to be dimmed by the dimming pit 111.

In order to protect the plurality of light sources 12 formed on the base substrate 10, the plurality of light sources 12 can be encapsulated on the base substrate 10 using an encapsulant. At this time, the plurality of light sources 12 are covered with an encapsulating protection layer to realize encapsulation and protection of the plurality of light sources 12.

It should be noted that, there are a large number of specific types of the plurality of base substrates 10 described above are relatively large, and the types of the base substrates 10 can be set according to the types of the light sources 12. For example, when the light sources 12 described above are LED chips, the LED chips can be fixed on the base substrate 10 one by one using a transfer technique to form an LED array substrate. The base substrate 10 can be a printed circuit board or a glass substrate plated with conductive material. In addition, in order to realize partitioned control, the plurality of LED chips can be controlled by a driving chip, so as to realize partitioned brightness control of the LED chips. Each partition has multiple adjustable gray levels.

In some embodiments, as shown in FIGS. 1-3, 7 and 8, when an orthographic projection of the plurality of dimming pits 111 on the base substrate 10 covers an orthographic projection of a plurality of the light sources 12 on the base substrate 10 at least in one-to-one correspondence, the geometric center of each of the light sources 12 can be aligned with that of the corresponding dimming pit 111. When the backlight module is actually assembled, it can be defined that the deviation for alignment accuracy is ±0.05 mm when the geometric center of each of the light sources 12 is aligned with that of the corresponding dimming pit 111. The assembling requirements can be achieved within such accuracy range, and the assembled backlight module can provide a surface light source 12 with favorable uniformity and viewing angle.

The shape of the light-exiting surface of each light source 12 can be set according to actual conditions. For example, when the shape of the light-exiting surface of each light source 12 is a rectangle, the maximum span direction of the opening of the dimming pit 111 can correspond to the long-side direction of the rectangle of the light-exiting surface of the corresponding light source 12. Specifically, if the light-exiting surface shape of each of the light sources 12 is a rectangle and the opening of the dimming pit 111 is a rectangle, the long-side direction of the opening of the dimming pit 111 is the same as that of the light-exiting surface of the light source 12.

Further, the long-side length of the light-exiting surface of each of the light sources 12 is twice or more as much as the short-side length, so that the light exiting from the light source 12 exits towards the direction in which the light guide plate 1 is situated as much as possible. Further, when the shape of the opening of the dimming pit 111 is a rectangle, the ratio of the long-side length to the short-side length of the opening of the dimming pit 111 is the same as the ratio of the long-side length to the short-side length of the corresponding light source 12, so that the dimming pit 111 more uniformly adjusts the light emitted by the corresponding light source 12.

An optical simulation software is used to establish an optical tracing model of the above-described backlight module, and a light receiver makes a statistic of a uniform condition in the intensity of illumination of the direct-lit backlight module.

Figure 9:
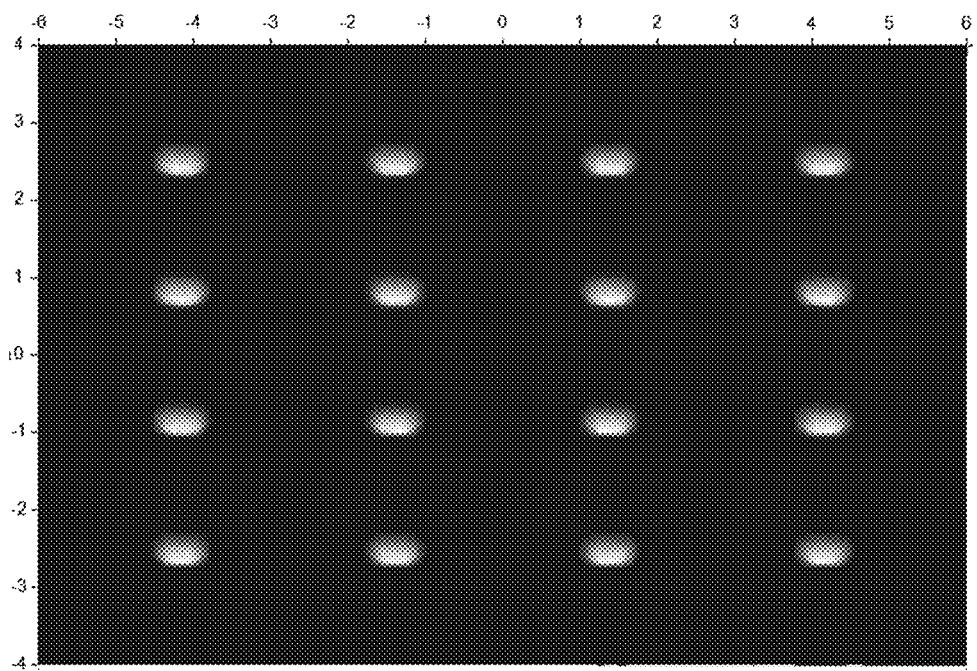
FIG. 9 is a view of surface uniformity obtained from a related direct-lit backlight module.
Figure 10:
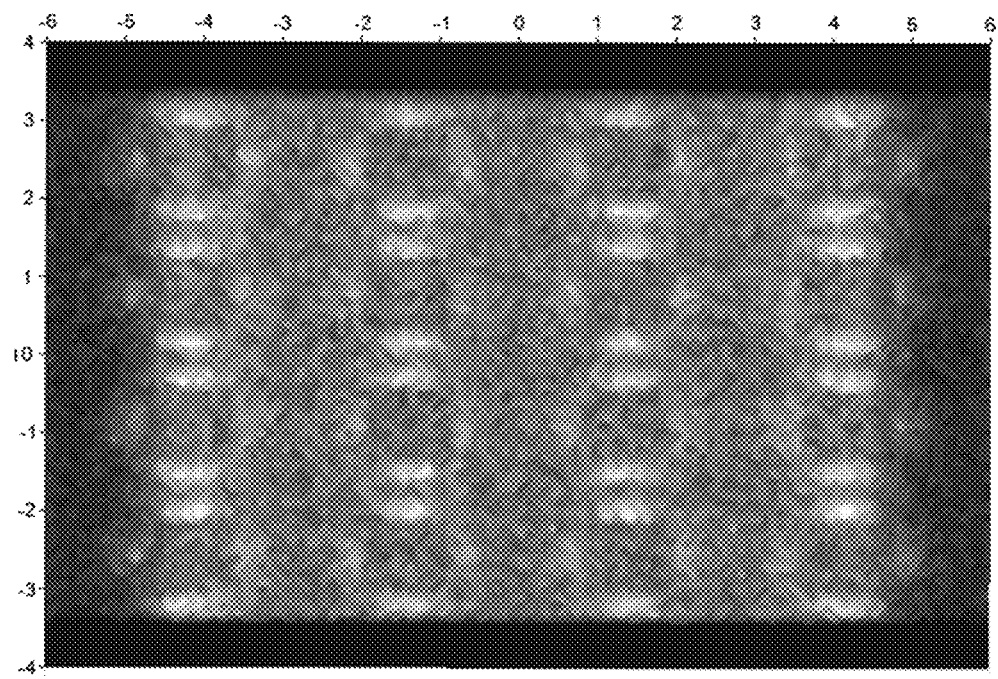
FIG. 10 is a view of surface uniformity obtained from a backlight module provided by an embodiment of the present disclosure.

In the related art, the direct-lit backlight module includes an LED array substrate, a light guide plate, and a diffusion film which are sequentially stacked. As shown in FIG. 9, the light receiver will have obvious bright spots, and the brightness will be concentrated.

For the backlight module provided in the embodiments of the present disclosure as shown in FIG. 7, it specifically comprises the LED array substrate, the light guide plate 1, the quantum dot material layer, the light intensifying film 14, and the diffusion film 15 that are sequentially stacked. The light-exiting surface b of the light-transmitting plate body 11 included in the light guide plate 1 is provided with a plurality of light-guiding dots 110 and a plurality of the above-described dimming pits 111, wherein the plurality of dimming pits 111 are distributed in a lattice that is opposite to a lattice of the LED chips. That is, the orthographic projection of the lattice of the LED chips on the base substrate 10 is located within the orthographic projection of the plurality of dimming pits 111 on the base substrate 10 in one-to-one correspondence. The inner wall of each of the dimming pits 111 includes four first-level dimming surfaces 11110 and four second-level dimming surfaces 11120, wherein an angle formed between each of the first-level dimming surfaces 11110 and a plane in which the light-exiting surface b of the light-transmitting plate body 11 is situated is less than 45°, and an angle formed between the second-level dimming surfaces 11120 and a plane in which the light-exiting surface b of the light-transmitting plate body 11 is situated is 75°. As shown in FIG. 9, when the backlight module provided by the embodiments of the present disclosure is used, the intensity of illumination on the light receiver is uniformly distributed, to form a desirable illumination effect of the surface light source 12.

It can be known from the above that: when the backlight module provided by the embodiments of the present disclosure contains the above-described light guide plate 1, the light of the surface light source 12 can be uniformly distributed, and concentrated at a forward viewing angle. Moreover, the stacking manner of the LED array substrate, the light guide plate 1, the quantum dot material layer, the light intensifying film 14, and the diffusion film 15 included in the backlight module makes a compact structure of the backlight module, and is favorable for a light and thin backlight module.

The embodiments of the present disclosure further provide a display device, which comprises the backlight module according to the above-described embodiments.

The advantageous effects of the display device provided by the embodiments of the present disclosure are the same as those of the above-described light guide plate 1, and will not be described in detail here.

Wherein, the display device provided by the above-described embodiments can be any product or member having a display function, such as a mobile phone, a tablet, a television, a display, a notebook computer, a digital photo frame, or a navigator.

In the descriptions of the above embodiments, specific features, structures, materials or characteristics can be combined in a suitable manner in any one or more embodiments or examples.

The foregoing descriptions are merely the embodiments of the present disclosure, but the protection scope of the present disclosure is not limited thereto. Anyone skilled in the art can easily anticipate a variation or a replacement within the technical scope disclosed by the present disclosure, which should all be within the protection scope of the present disclosure. Thus, the protection scope of the present disclosure should be determined by the protection scope of the claims.

What is claimed is:

1. A light guide plate comprising a light-transmitting plate body, wherein a plurality of light guide dots are disposed on a light-exiting surface of the light-transmitting plate body,
the light-exiting surface of the light-transmitting plate body is provided with a plurality of dimming pits, and the plurality of light guide dots are provided around each of the dimming pits; and
an inner wall of each of the dimming pits sequentially includes multiple levels of dimming surfaces along a depth direction of the dimming pits for reflecting light incident thereon to the light guide dots,
wherein along a direction in which a depth of each of the dimming pits increases, the inner wall of each of the dimming pits sequentially includes a first-level dimming surface and a second-level dimming surface, an angle between the first-level dimming surface and a plane in which the light-exiting surface of the light-transmitting plate body is situated is less than 45°, and an angle between the second-level dimming surface and a plane in which the light-exiting surface of the light-transmitting plate body is situated is greater than or equal to 45° and less than 90°; and wherein a bottom of each of the dimming pits is a cambered bottom having an arc-shaped opening which faces an opening portion of the dimming pit a plurality of scattering structures in one-to-one correspondence to the plurality of dimming pits are provided on the light-incident surface of the light-transmitting plate body, and an orthographic projection of each of the scattering structures in a plane where the light-incident surface of the light-transmitting plate body is situated at least partially covers an orthographic projection of the cambered bottom of each of the dimming pits in a plane where the light-incident surface of the light-transmitting plate body is situated.

2. The light guide plate according to claim 1, wherein angles between each level of the dimming surfaces included in the inner wall of each of the dimming pits and a plane in which the light-exiting surface of the light-transmitting plate body is situated sequentially increases along a direction in which a depth of each of the dimming pits increases.

3. The light guide plate according to claim 1, wherein each of the dimming pits includes multiple levels of dimming portions in one-to-one correspondence to the multiple levels of dimming surfaces, and an inner wall of each level of the dimming portions includes at least one corresponding level of the dimming surfaces.

4. The light guide plate according to claim 1, wherein each of the scattering structures is a scattering film; or each of the scattering structures includes a plurality of prismatic pits.

5. The light guide according to claim 1, wherein the dimming surfaces are used for totally reflecting light incident thereon to the light guide dots.

6. A method of fabricating a light guide plate, wherein the light guide plate comprises a light-transmitting plate body, a plurality of light guide dots are disposed on a light-exiting surface of the light-transmitting plate body, the light-exiting surface of the light-transmitting plate body is provided with a plurality of dimming pits, and a plurality of light guide dots are provided around each of the dimming pits; and an inner wall of each of the dimming pits sequentially includes multiple levels of dimming surfaces along a depth direction of the dimming pits, for reflecting light incident thereon to the light guide dots, wherein along a direction in which a depth of each of the dimming pits increases, the inner wall of each of the dimming pits sequentially includes a first-level dimming surface and a second-level dimming surface, an angle between the first-level dimming surface and a plane in which the light-exiting surface of the light-transmitting plate body is situated is less than 45°, and an angle between the second-level dimming surface and a plane in which the light-exiting surface of the light-transmitting plate body is situated is greater than or equal to 45° and less than 90°; and wherein a bottom of each of the dimming pits is a cambered bottom having an arc-shaped opening which faces an opening portion of the dimming pit a plurality of scattering structures in one-to-one correspondence to the plurality of dimming pits are provided on the light-incident surface of the light-transmitting plate body, and an orthographic projection of each of the scattering structures in a plane where the light-incident surface of the light-transmitting plate body is situated at least partially covers an orthographic projection of the cambered bottom of each of the dimming pits in a plane where the light-incident surface of the light-transmitting plate body is situated, the fabricating method comprises:

providing a light guide plate mold, wherein the light guide plate mold includes a plate body mold which is provided with a plurality of dot molds for forming the plurality of light guide dots and a plurality of dimming molds for forming the plurality of dimming pits; the dimming molds sequentially include multiple levels of mold surfaces for forming the multiple levels of dimming surfaces along a direction in which heights of the dimming molds increase;

adding plate body material to the light guide plate mold such that the plate body material is molded with the light guide plate mold, to obtain the light guide plate.

7. A backlight module, wherein it comprises a light source and a light guide plate, the light guide plate comprises a light-transmitting plate body, a plurality of light guide dots are disposed on a light-exiting surface of the light-transmitting plate body, the light-exiting surface of the light-transmitting plate body has a plurality of dimming pits, and a plurality of light guide dots are provided around each of the dimming pits; and an inner wall of each of the dimming pits sequentially includes multiple levels of dimming surfaces along a depth direction of the dimming pits, for reflecting light from the light source to the light guide dots, wherein along a direction in which a depth of each of the dimming pits increases, the inner wall of each of the dimming pits sequentially includes a first-level dimming surface and a second-level dimming surface, an angle between the first-level dimming surface and a plane in which the light-exiting surface of the light-transmitting plate body is situated is less than 45°, and an angle between the second-level dimming surface and a plane in which the light-exiting surface of the light-transmitting plate body is situated is greater than or equal to 45° and less than 90°; and wherein a bottom of each of the dimming pits is a cambered bottom having an arc-shaped opening which faces an opening portion of the dimming pit a plurality of scattering structures in one-to-one correspondence to the plurality of dimming pits are provided on the light-incident surface of the light-transmitting plate body, and an orthographic projection of each of the scattering structures in a plane where the light-incident surface of the light-transmitting plate body is situated at least partially covers an orthographic projection of the cambered bottom of each of the dimming pits in a plane where the light-incident surface of the light-transmitting plate body is situated, and the light source is disposed on a light-incident surface of the light-transmitting plate body of the light guide plate.

8. The backlight module according to claim 7, wherein the light source is disposed on a base substrate, and a reflective layer is formed on a surface of the base substrate provided with the light source.

9. The backlight module according to claim 7, wherein the light-exiting surface of the light-transmitting plate body is provided with an light intensifying film having a plurality of prism structures, and each of the prism structures has an apex angle of less than 45°.

10. The backlight module according to claim 7, wherein the light source is a non-white light source, and the light-exiting surface of the light source is provided with a fluorescent layer for converting the light from the light source into white light.

11. The backlight module according to claim 7, wherein the light source is a non-white light source, and the light-exiting surface of the light guide plate is provided with a quantum dot material layer or fluorescent layer; the quantum dot material layer or fluorescent layer is used for converting the light from the light source into white light.

12. The backlight module according to claim 7, wherein a plurality of the light sources are formed on the base substrate, and an orthographic projection of the plurality of dimming pits on the base substrate covers an orthographic projection of a plurality of the light sources on the base substrate at least in one-to-one correspondence.

13. A display device, comprising the backlight module according to claim 7.

* * * * *

UNITED STATES PATENT AND TRADEMARK OFFICE
CERTIFICATE OF CORRECTION

PATENT NO. : 10,782,469 B2  
APPLICATION NO. : 16/399054  
DATED : September 22, 2020  
INVENTOR(S) : Yinwei Chen et al.

Page 1 of 1

It is certified that error appears in the above-identified patent and that said Letters Patent is hereby corrected as shown below:

Column 11, Line 10, Claim 1, delete "pit" and insert -- pit; --

Column 11, Line 37, Claim 5, after "guide" insert -- plate --

Column 11, Line 64, Claim 6, delete "pit" and insert -- pit; --

Column 12, Line 47, Claim 7, delete "pit" and insert -- pit; --

Signed and Sealed this  
Twenty-second Day of December, 2020

Andrei Iancu  
*Director of the United States Patent and Trademark Office*